United States Patent [19]

Tung

[11] Patent Number: 5,636,040
[45] Date of Patent: Jun. 3, 1997

[54] AUTOMATIC INTENSITY CONTROL OF THE LAMP WITHIN IMAGE SCANNING APPARATUS

[75] Inventor: Chi-Chung Tung, Kweishan, Taiwan

[73] Assignee: Acer Peripherals, Inc., Taoyuan, Taiwan

[21] Appl. No.: 509,977

[22] Filed: Aug. 1, 1995

[51] Int. Cl.$^6$ .................................................. H04N 1/04
[52] U.S. Cl. ........................................... 358/475; 358/487
[58] Field of Search .................................. 358/475, 487, 358/474, 494, 483; 355/228, 229, 67, 69; 348/370

[56] References Cited

U.S. PATENT DOCUMENTS

| | | | |
|---|---|---|---|
| 4,408,231 | 10/1983 | Bushaw et al. | 358/475 |
| 4,803,556 | 2/1989 | Beikirch | 358/475 |
| 5,173,789 | 12/1992 | Renner et al. | 358/475 |
| 5,278,674 | 1/1994 | Webb et al. | 358/475 |
| 5,343,308 | 8/1994 | Johnston | 358/445 |
| 5,514,864 | 5/1996 | Mu-Tung et al. | 358/475 |

Primary Examiner—Scott A. Rogers
Attorney, Agent, or Firm—Fish & Richardson P.C.

[57] ABSTRACT

The instant invention provides an automatic intensity control of the lamp within the scanning apparatus such that the quality of the output of the image scanning operation is set to a controlled level. Also, the programmable intensity control of the lamp within the scanning apparatus in accordance with the preference of the user of the image scanner apparatus is made possible by the invention. The image scanning apparatus comprises an image capture device and a light source device. The image capture device receives a light signal passing through the original and generates a light control signal, responsive to the intensity of the light, i.e. brightness, received. The light source device is powered by a power supply to irradiate the light of desired intensity, responsive to the light control signal, to illuminate the original. In auto-brightness mode, the intensity of the light irradiated from the lamp is set to a constant value when the intensity of lamp drifts. In manual-brightness mode, the user may change the intensity of the light irradiated from the lamp via utility program run in a personal computer such that the output of the image scanning process meets his/her preference.

4 Claims, 1 Drawing Sheet

AUTOMATIC INTENSITY CONTROL OF THE LAMP WITHIN IMAGE SCANNING APPARATUS

TECHNICAL FIELD OF INVENTION

This invention relates to an image scanning apparatus for scanning the image on an original of light-transmitting material.

BACKGROUND OF THE INVENTION

The image scanning apparatus has been widely used nowadays in many applications. In the recent, apparatus capable of scanning image in both the reflective mode and transparent mode was introduced into the market. The basic principle and detailed structure of the scanning apparatus of the type mentioned may be referred to the U.S. Pat. No. 4,879,604.

The lamp used to illuminate the original having image thereon may be a hot cathode fluorescent lamp or a cold cathode fluorescent lamp widely used in office automation equipments, e.g. facsimile, xerox machine or scanner.

Like other types of the lamp, the quality of the lamp used in the image scanning apparatus and, therefore, the intensity of light illuminated from the lamp deteriorates as the lamp operates for a certain amount of time. Due to the aforesaid reason, the quality of the output of the image scanning operation is worse than that when the lamp is a brand new one.

On the other hand, the light transmissivity of different original bearing image thereon may vary. A light source of preset intensity will likely be too bright for different original and the result of the scanning process will be poor. Under this kind of condition, the intensity of light irradiated by the lamp must be reduced to a desired level.

SUMMARY OF THE INVENTION

In order to compensate the intensity deterioration of the lamp used and keep the output quality of the image scanning operation at a desired level as intensity is too bright or dark for an original, the instant invention provides an automatic intensity control of the lamp within the scanning apparatus.

Another object of the invention is to provide a programmable intensity control of the lamp within the scanning apparatus in accordance with the user's preference.

The image scanning apparatus comprises an image capture device and a light source device. The image capture device receives a light signal passing through the original and generates at least a light control signal, responsive to the intensity of the light received.

The light source device is powered by a power supply to irradiate the light of desired intensity, responsive to the light control signal, to illuminate the original.

In a preferred embodiment, the intensity of the light irradiated from the lamp is set to a constant value even when the lamp begins to deteriorate.

In another embodiment, the user may change the intensity of the light irradiated from the lamp such that the output of the image scanning process meets his/her preference.

BRIEF DESCRIPTION OF THE APPENDED DRAWINGS

FIG. 1 shows the instant invention in functional blocks.

DETAILED DESCRIPTION OF THE PREFERRED EMBODIMENT

Figure 1:
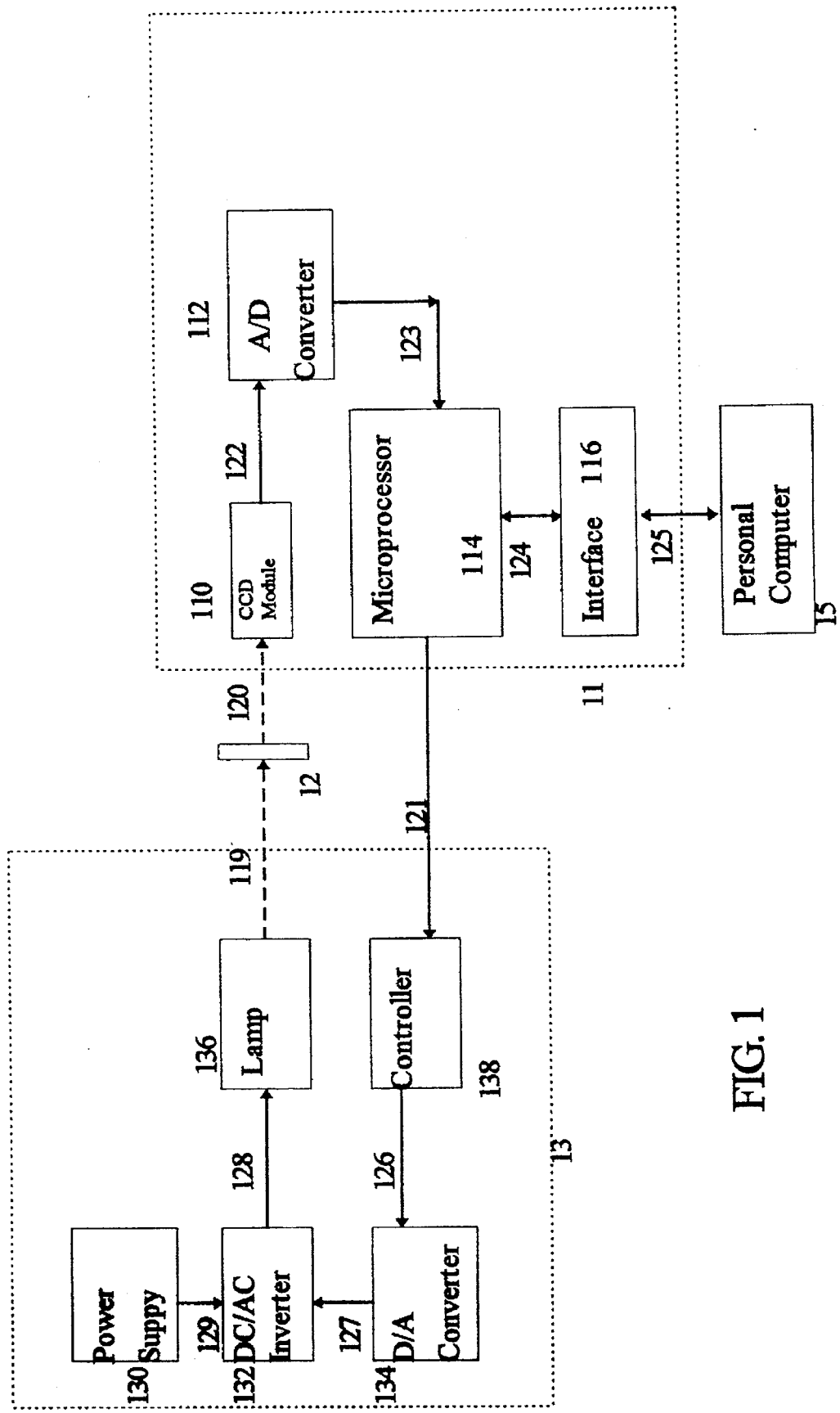

Referring to FIG. 1, the invention comprises an image capture device 11 and a light source device 13. The image capture device 11 functions to receive the light 120 passing through the original 12 of a light-transparent material and sends the digitized image signal 124 to the personal computer system 15 connected thereto in a well known manner via an interface circuit 116, e.g. a SCSI interface. In addition, responsive to the intensity of the light signal 120 received, the image capture device 11 further generates at least a light control signal 121.

In one embodiment, the image capture device 11 comprises an image capture element 110, e.g. CCD module, an Analog/Digital signal converter 112 and a microprocessor 114. The CCD module 110 converts the light signal 120 into the electrical voltage signal 122 and outputs the signal 122 to the Analog/Digital signal converter 112. The Analog/Digital signal converter 112 outputs the image information in form of digitized signal 123 to the microprocessor 114. The microprocessor 114 operates, depending on the image characteristics on the original, e.g. positive or negative image, to generate the image information 124. Furthermore, the microprocessor 114 compares the value of the digital signal 123 with a default value or a preset value input by user via interface 116 and, if difference is obtained through comparison, activates a light control signal 121 in a predetermined algorithm programmed within the microprocessor 114. In other words, as the microprocessor 114 detects the decrease of the light intensity via the value of the digital signal 123, it enables the light control signal 121 informing the light source device 13 in order to make the adjustment.

In a preferred embodiment, the light source device 13 comprises a controller 138, a Digital/Analog converter 134, a DC/AC inverter 132 and a lamp 136. The controller 138, responsive to the light control signal 121, generates a control code signal 126. The Digital/Analog converter 134 converts the control code signal 126 into analog inverter-control signal 127 and outputs the signal 127 to the DC/AC inverter 132. The DC/AC inverter 132 is coupled to input the DC power supply 129 and, under the control of the voltage value of inverter-control signal 127, outputs the lamp voltage signal 128 to the lamp 136. The lamp 136, e.g. hot or cold cathode fluorescent lamp known in the arts, irradiates the light signal 119 of the required intensity corresponding to the light control signal 121.

The invention may be operated in either automatic adjustment mode or manual adjustment mode. When automatic adjustment mode is selected, each time the intensity of light 120 received decreases (or alternatively increases), the voltage value of electrical signal 122 decreases (or accordingly increases), the value of digitized signal 123 decreases proportionally, the value of the control code signal 126 decreases (or accordingly increases), the voltage value of the light control signal 127 decreases (or accordingly increases), the lamp voltage 128 increases (or accordingly decreases) and finally the intensity of light 119 is increased (or accordingly decreased) to compensate the previous decrease (or increase) of the intensity such that a stable controlled value of intensity is obtained. In other words, under automatic adjustment mode, the feedback loop provided may keep the intensity of light received by the CCD module at a constant level.

As manual adjustment mode is selected, the user of the scanning apparatus may, via an utility program run in the computer 15 which couples to the image capture device 11 via interface 116, input his/her lamp brightness selection to the microprocessor 114. Based on the selection, the microprocessor 114 then generates a corresponding light control signal 121 which forces the controller 138 generating a corresponding control code 126. The corresponding control codes changes the voltage of the inverter-control signal 127. The change of the voltage of the inverter-control signal 127 forces the DC/AC inverter 132 generating a corresponding lamp voltage 128 to adjust the intensity of the light 119 irradiated by the lamp 136 to meet the preference.

I claim:

1. An image scanning apparatus for reading image data formed on an original of light-transmitting material, comprising:

an image capture means for receiving a light of an intensity level passing through the original and, responsive to the intensity of the light, for generating a light control signal;

a light source means coupled to a power supply for, responsive to the light control signal, irradiating the light at a controlled intensity level to illuminate the original, wherein the light source means comprising:

a control means, responsive to the light control signal, for generating a control code;

a Digital to Analog converter, responsive to the control code, for generating an inverter-control signal;

a DC/AC inverter adapted to input the power supply for, responsive to the inverter-control signal, outputting a lamp voltage signal;

a lamp, responsive to the lamp voltage signal, for irradiating the light.

2. The image scanning apparatus as recited in claim 1, wherein the controlled intensity level has a constant value.

3. The image scanning apparatus as recited in claim 1, wherein the lamp is a hot cathode fluorescent lamp.

4. The image scanning apparatus as recited in claim 1, wherein the lamp is a cold cathode fluorescent lamp.

* * * * *